(12) United States Patent
Gormley

(10) Patent No.: US 11,187,187 B2
(45) Date of Patent: Nov. 30, 2021

(54) THRUST REVERSER

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 679 days.

(21) Appl. No.: 16/055,791

(22) Filed: Aug. 6, 2018

(65) Prior Publication Data

US 2020/0040844 A1 Feb. 6, 2020

(51) Int. Cl.
*F02K 1/60* (2006.01)
*F02K 1/76* (2006.01)

(52) U.S. Cl.
CPC ............... *F02K 1/60* (2013.01); *F02K 1/763* (2013.01)

(58) Field of Classification Search
CPC ..... F02K 1/60; F02K 1/56; F02K 1/54; F02K 1/70; F05D 2240/128
See application file for complete search history.

(56) References Cited

U.S. PATENT DOCUMENTS

| | | | |
|---|---|---|---|
| 3,266,734 A * | 8/1966 | Gahagan | F02K 1/563 239/265.29 |
| 4,410,152 A | 10/1983 | Kennedy et al. | |
| 5,103,634 A * | 4/1992 | Harrison | F02K 1/563 239/265.33 |
| 5,176,340 A | 1/1993 | Lair | |
| 5,779,192 A | 7/1998 | Metezeau | |
| 5,853,148 A | 12/1998 | Standish et al. | |
| 6,688,099 B2 | 2/2004 | Lair | |
| 8,002,217 B2 | 8/2011 | Sternberger | |
| 8,015,797 B2 | 9/2011 | Lair | |
| 8,127,530 B2 | 3/2012 | Lair et al. | |
| 2008/0072570 A1 * | 3/2008 | Lair | F02K 1/60 60/226.2 |
| 2009/0313969 A1 * | 12/2009 | Lair | F02K 1/60 60/226.2 |
| 2016/0340052 A1 * | 11/2016 | Vulpillieres | B64D 27/16 |
| 2019/0120171 A1 * | 4/2019 | Gormley | F02K 1/70 |
| 2019/0162135 A1 * | 5/2019 | Channell | F02K 1/60 |
| 2019/0301399 A1 | 10/2019 | Lacko | |

FOREIGN PATENT DOCUMENTS

EP 715068 * 6/1996

OTHER PUBLICATIONS

EP 715068 Translation (Year: 1996).*
EP search report for EP19190250.1 dated Mar. 25, 2020.

* cited by examiner

*Primary Examiner* — Gerald L Sung
(74) *Attorney, Agent, or Firm* — Getz Balich LLC

(57) ABSTRACT

An assembly for an aircraft propulsion system is provided, the assembly having an axial centerline. The assembly comprises a fixed structure, a first thrust reverser door, and a second thrust reverser door. The first thrust reverser door being pivotally attached to the fixed structure along a first pivot axis, and the second thrust reverser door being pivotally attached to the fixed structure along a second pivot axis. The first pivot axis and the second pivot axis are both radially located at a first distance from the assembly axial centerline. The first pivot axis is located at a first axial position, and the second pivot axis is located at a second axial position. The second axial position is displaced from the first axial position.

20 Claims, 8 Drawing Sheets

THRUST REVERSER

BACKGROUND

1. Technical Field

This disclosure relates generally to an aircraft propulsion system and, more particularly, to a thrust reverser for an aircraft propulsion system.

2. Background Information

Certain types of gas turbine engines are known to include a fan section that produces a bypass airflow for providing the majority of engine propulsion and a combustion or core airflow for compression, mixing with fuel, combustion and expansion through a turbine to drive the fan section. Such engines are typically configured with a nacelles that partially surrounds the core of the engine, and provide an annular bypass airflow duct for directing the bypass airflow in a rearward direction to produce forward propulsion. A nacelle may further include a thrust reverser capable of redirecting the bypass airflow and/or core airflow from the rearward direction to, at least partially, a forward direction thus producing a rearward propulsion. As an example, such rearward propulsion may serve to decelerate the forward motion of an aircraft soon after landing.

Thrust reversers may include a plurality of blocker doors physically capable of changing positions through mechanical and hydraulic linkages from a stowed position for forward propulsion and to a deployed position for rearward propulsion. There exists a need to improve the efficiency and performance of such thrust reversers.

SUMMARY OF THE DISCLOSURE

According to a first aspect of the present disclosure, an assembly for an aircraft propulsion system is provided that includes a fixed structure, a first thrust reverser door, a second thrust reverser door, a first support arm, and a second support arm. The fixed structure at least partially defines a gas path. The fixed structure has a first side, an opposite second side, and an axial centerline. The first support arm is disposed on the first side of the fixed structure and the second support arm is disposed on the second side of the fixed structure. The first thrust reverser door being pivotally attached to the first support arm and the second support arm at first pivot joints. The first thrust reverser door has a first axis of rotation radially located at a first distance from the axial centerline and at a first axial position. The second thrust reverser door being pivotally attached to the first support arm and the second support arm at second pivot joints. The second thrust reverser door has a second axis of rotation radially located at the first distance from the axial centerline and at a second axial position. The second axial position is displaced from the first axial position. The first thrust reverser door and the second thrust reverser door are rotatable between a stowed position and a plurality of deployed positions.

In any of the aspects or embodiments described above and herein, the assembly may further comprise a pair of first thrust reverser door hinges, one of which first thrust reverser door hinges is fixedly attached to the first thrust reverser door and pivotally attached to the first support arm, and the other first thrust reverser door hinges is fixedly attached to the first thrust reverser door and pivotally attached to the second support arm.

In any of the aspects or embodiments described above and herein, the assembly may further comprise a first actuator configured to rotate the first thrust reverser door about the first axis of rotation.

In any of the aspects or embodiments described above and herein, the first thrust reverser door may be attached to the assembly by the first actuator and the first thrust reverser hinges.

In any of the aspects or embodiments described above and herein, the assembly may further comprise a pair of second thrust reverser door hinges, one of which second thrust reverser door hinges is fixedly attached to the second thrust reverser door and pivotally attached to the first support arm, and the other second thrust reverser door hinges is fixedly attached to the second thrust reverser door and pivotally attached to the second support arm.

In any of the aspects or embodiments described above and herein, the assembly may further comprise a second actuator configured to rotate the second thrust reverser door about the second axis of rotation.

In any of the aspects or embodiments described above and herein, the second thrust reverser door may be attached to the assembly by the second actuator and the second thrust reverser hinges.

In any of the aspects or embodiments described above and herein, in at least one of the plurality of deployed positions, the first thrust reverser door and the second thrust reverser door collectively block the gas path at a nozzle end of the assembly.

In any of the aspects or embodiments described above and herein, in the stowed position, the first thrust reverser door may form a portion of the gas path.

In any of the aspects or embodiments described above and herein, the first thrust reverser door may include an inner panel that mates with the fixed structure to form a portion of the gas path.

In any of the aspects or embodiments described above and herein, the second thrust reverser door may form a portion of the gas path.

In any of the aspects or embodiments described above and herein, the second thrust reverser door may include an inner panel that mates with the fixed structure to form a portion of the gas path.

According to another aspect of the present disclosure, a thrust reverser assembly for an aircraft propulsion system is provided. The thrust reverser assembly has an axial centerline. The thrust reverser assembly comprises a fixed structure, a first thrust reverser door, and a second thrust reverser door. The first thrust reverser door is pivotally attached to the fixed structure along a first pivot axis, and the second thrust reverser door is pivotally attached to the fixed structure along a second pivot axis. The first pivot axis and the second pivot axis are both radially located at a first distance from the assembly axial centerline. The first pivot axis is located at a first axial position, and the second pivot axis is located at a second axial position. The second axial position is displaced from the first axial position.

In any of the aspects or embodiments described above and herein, the first thrust reverser door and the second thrust reverser door are rotatable between a stowed position and a plurality of deployed positions.

In any of the aspects or embodiments described above and herein, the thrust reverser assembly may further comprise a first support arm disposed on and attached to the first side of the fixed structure and a second support arm disposed on and attached to the second side of the fixed structure. The first thrust reverser door may be pivotally attached to the first support arm and to the second support arm. The second thrust reverser door may be pivotally attached to the first support arm and to the second support arm.

In any of the aspects or embodiments described above and herein, the assembly may further comprise a pair of first thrust reverser door hinges, one of which first thrust reverser door hinge is fixedly attached to the first thrust reverser door and pivotally attached to the first support arm, and the other first thrust reverser door hinge is fixedly attached to the first thrust reverser door and pivotally attached to the second support arm.

In any of the aspects or embodiments described above and herein, the assembly may further comprise a first actuator configured to rotate the first thrust reverser door about the first pivot axis.

In any of the aspects or embodiments described above and herein, the assembly may further comprise a pair of second thrust reverser door hinges, one of which second thrust reverser door hinge is fixedly attached to the second thrust reverser door and pivotally attached to the first support arm, and the other first thrust reverser door hinge is fixedly attached to the second thrust reverser door and pivotally attached to the second support arm.

In any of the aspects or embodiments described above and herein, the assembly may further comprise a second actuator configured to rotate the second thrust reverser door about the second pivot axis.

In any of the aspects or embodiments described above and herein, the fixed structure may at least partially define a gas path, and in at least one of the plurality of deployed positions, the first thrust reverser door and the second thrust reverser door may collectively block the gas path at a nozzle end of the assembly.

In any of the aspects or embodiments described above and herein, in the stowed position, the first thrust reverser door and the second thrust reverser door may each form a portion of the gas path.

DETAILED DESCRIPTION

Figure 1:
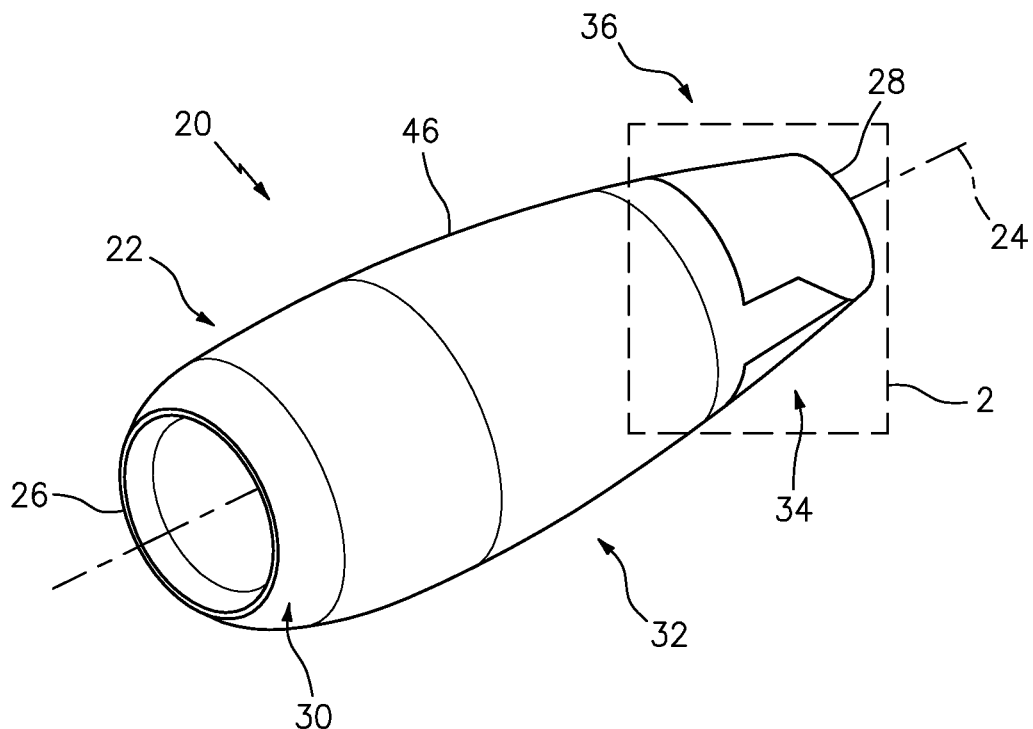
FIG. 1 is a perspective illustration of an aircraft propulsion system, in accordance with various embodiments.
Figure 2:
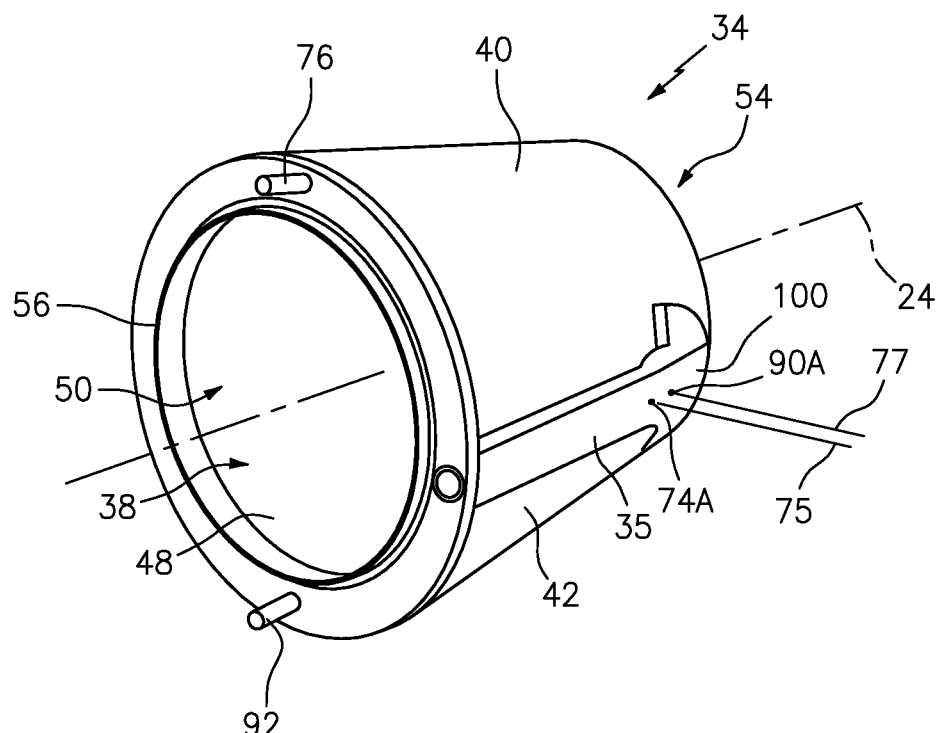
FIG. 2 is a perspective illustration of an aft structure of the aircraft propulsion system with stowed thrust reverser doors, in accordance with various embodiments.

FIG. 1 is a perspective illustration of an aircraft propulsion system 20 for an aircraft such as, but not limited to, a commercial airliner, a business jet, a cargo plane, etc. This propulsion system 20 includes a nacelle 22 and a gas turbine engine. The gas turbine engine may be configured as a turbojet gas turbine engine; however, the present disclosure is not limited to such an exemplary gas turbine engine configuration.

The nacelle 22 is configured to house and provide an aerodynamic cover for the gas turbine engine. The nacelle 22 extends along an axial centerline 24 of the aircraft propulsion system 20 between a nacelle upstream, forward end 26 and a nacelle downstream, aft end 28. The nacelle 22 of FIG. 1 includes a nacelle inlet structure 30, one or more cowls 32 (one such cowl visible in FIG. 1) and a nacelle aft structure 34, which is configured as part of, or includes, a thrust reverser 36 such as, but not limited to, a target-type thrust reverser. The terms "target-type thrust reverser" and "clamshell-type thrust reverser" herein may both describe a thrust reverser with one or more (e.g., a pair of) outwardly pivoting doors. However, whereas the doors of a clamshell-type thrust reverser only redirect an outer cold gas stream (e.g., a bypass gas stream) and not an inner hot gas stream (e.g., a core gas stream), the doors of a target-type thrust reverser may redirect at least a portion of the hot gas stream and, in some embodiments, also a cold gas stream where the gas turbine engine is a turbofan gas turbine engine, for example.

The inlet structure 30 is disposed at the nacelle forward end 26. The inlet structure 30 is configured to direct a stream of air through an inlet opening at the nacelle forward end 26 and into a forward-most stage (e.g., a low-pressure compressor (LPC) stage or a fan stage) of the gas turbine engine.

The cowls 32 are disposed axially between the inlet structure 30 and the aft structure 34. The cowls 32 are configured to provide an aerodynamic covering for a casing of the gas turbine engine.

Referring to FIGS. 2-8, the aft structure 34 includes a fixed structure 38, a first thrust reverser door 40 (e.g., shown as the "upper door"), a second thrust reverser door 42 (e.g., shown as the "lower" door), a first support arm 35, a second support arm 37, a pair of first thrust reverser door hinges 39A, 39B ("FTRD hinges"), and a pair of second thrust reverser door hinge 41A, 41B ("STRD hinges"). The aft structure 34 and its components are configured to form an aft portion of an outer aerodynamic flow surface 46 of the nacelle 22 (see FIG. 1). The aft structure 34 and its components are also configured to form an aft portion of an inner aerodynamic flow surface 48. The aft portion of the inner aerodynamic flow surface 48 forms an outer peripheral boundary of an aft-most portion of a gas path 50 within the aircraft propulsion system 20; e.g., a core gas path. The aft-most portion of the gas path 50 may receive a mixed gas flow (e.g., a mix of a core gas and/or bypass air) from an upstream portion (or portions) of the gas turbine engine; e.g., from a bypass duct and/or core flow of the gas turbine engine. The aft-most portion of the gas path 50 extends axially along the axial centerline 24 within the aircraft propulsion system 20 to an annular trailing edge 52 of a gas path nozzle 54, at which the gas path 50 meets an exterior environment surrounding the aircraft propulsion system 20.

The fixed structure 38 has a generally tubular configuration, and extends axially along the centerline 24 between a fixed structure forward end 56 and a fixed structure aft end 58. A portion of the fixed structure 38 adjacent the forward end 56 is annular, extending completely around the circumference of the fixed structure 38. A portion of the fixed structure 38 adjacent the aft end 58 includes a pair of segments 44A, 44B, disposed on opposite sides of the fixed structure 38, each extending a limited circumferential distance, and thereby creating a first void 60 (e.g., an "upper" void) and a second void 62 (e.g., a "lower" void). As will be explained hereinafter, each thrust reverser door 40, 42 includes an inner arcuate panel 70, 86 that is configured to mate with the fixed structure segments 44A, 44B to collectively create an annular structure; e.g., a continuation of the forward annular portion of the fixed structure 38. In some embodiments, the interior surface 63 of the fixed structure 38 forms a respective portion of the inner aerodynamic flow surface 48. In some embodiments, inner panels (not shown) may be attached to the interior surface 63 of the fixed structure 38 to create the respective portion of the inner aerodynamic flow surface 48.

The first support arm 35 extends axially between a forward end 96 and an aft end 98. At the aft end 98, the first support arm 35 includes an arcuately shaped flange surface 100. The second support arm 37 extends axially between a forward end 102 and an aft end 104. At the aft end 104, the second support arm 37 includes an arcuately shaped flange surface 106. In the embodiment shown in the FIGURES, the first and second support arms 35, 37 are configured the same, albeit as right and left versions. In other embodiments, the first and second support arms 35, 37 may be configured differently from one another. The first support arm 35 is disposed on a first side of the aft structure 34, and the second support arm 37 is disposed on a second side (opposite the first side) of the aft structure 34. In some embodiments, the first and second support arms 35, 37 may be integrally formed with the fixed structure 38. In some embodiments, the first and second support arms 35, 37 may be independent of, but attached to, the fixed structure 38.

The first thrust reverser door 40 extends between a first (e.g., forward) door end 64 and a second (e.g., aft) door end 66. As explained above, the aft structure 34 is configured to form an aft portion of an outer aerodynamic flow surface 46 of the nacelle 22 (see FIG. 1). The first thrust reverser door 40 extends circumferentially (e.g., between 150-180 degrees) about the centerline 24 between opposing door sides 68A, 68B. The first thrust reverser door 40 includes an inner arcuate panel 70 and an outer arcuate panel 72. The outer arcuate panel 72 includes an interior surface 108 and an exterior surface 110. The inner arcuate panel 70 is contiguous with the interior surface 108 of the outer arcuate panel 72 and may be attached to the interior surface 108. As indicated above, the inner arcuate panel 70 is configured to mate with the aft segments 44A, 44B of the fixed structure 38 to define a respective portion of the inner aerodynamic surface 48 and, thus, a respective outer peripheral boundary portion of the gas path 50 when the first thrust reverser door 40 is in its stowed position. Thus, when the first thrust reverser door 40 is in the stowed (e.g., closed) position, the interior surface 112 of the inner arcuate panel 70 is substantially flush with the interior surface 63 of the fixed structure 38. When the first thrust reverser door 40 is in the stowed position, the exterior surface 110 of the outer arcuate panel 72 defines a respective portion of the outer aerodynamic surface 46 (see FIG. 1). In some embodiments when the first thrust reverser door 40 is in the stowed position, the outer arcuate panel 72 is configured to circumferentially and axially overlap a portion of the fixed structure 38.

Figure 5:
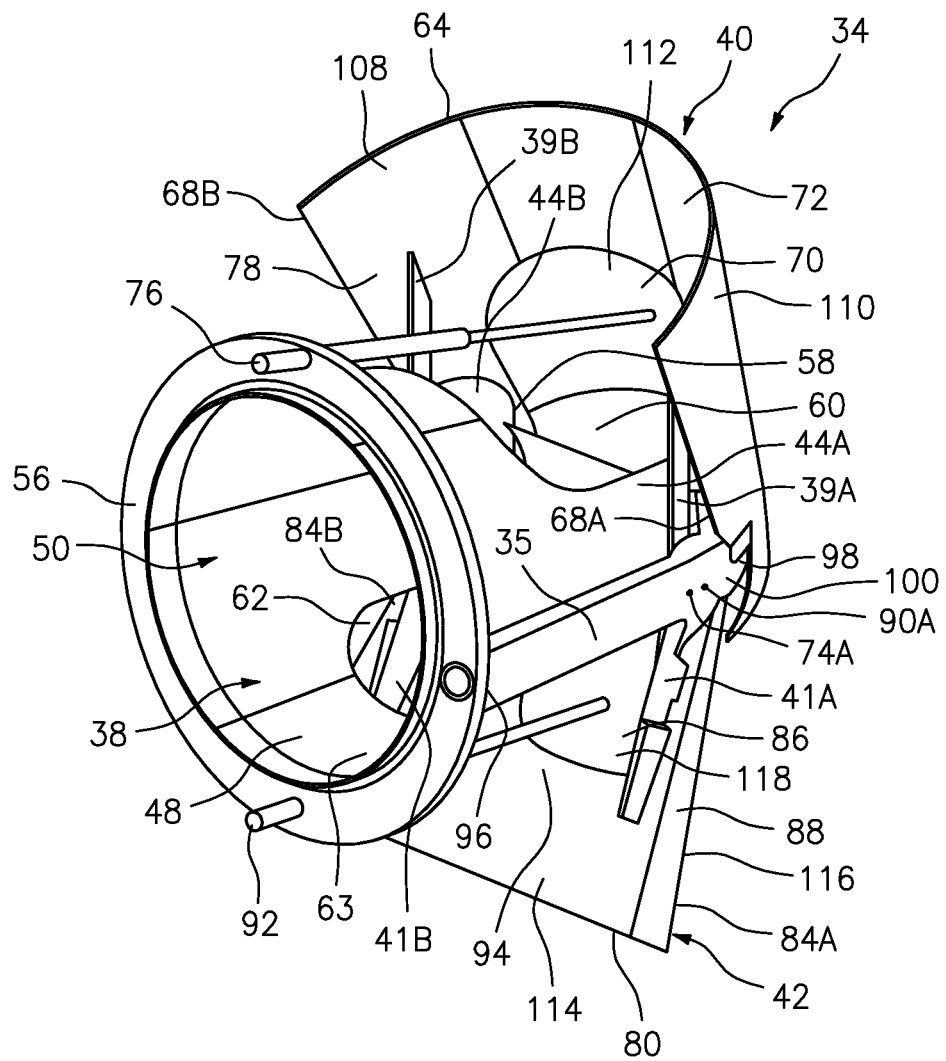
FIG. 5 is a perspective illustration of the aft structure of the aircraft propulsion system with deployed thrust reverser doors, in accordance with various embodiments.

The first thrust reverser door 40 is pivotally attached to both the first and second support arms 35, 37 via the FTRD hinges 39A, 39B. In the embodiment shown in the FIGURES, one of the FTRD hinges 39A, 39B is fixedly attached (i.e., non-rotationally attached) to one side of the first thrust reverser door 40 and pivotally attached via a pivot joint 74A, 74B to one of the first or second support arms 35, 37, and the other FTRD hinges 39A, 39B is fixedly attached (i.e., non-rotationally attached) to the opposite side of the first thrust reverser door 40 and pivotally attached via a pivot joint 74A, 74B to the other of the first or second support arms 35, 37. In the embodiments shown in the FIGURES, the pivot joints 74A, 74B pivot about a pivot axis 75 (in FIG. 3, pivot axis 75 extends out of the page). A first actuator 76 (e.g., a hydraulic, pneumatic or mechanical linear actuator) is configured between and attached to the fixed structure 38 and the first thrust reverser door 40. With this configuration, the first actuator 76 is operable to move (e.g., pivot) the first thrust reverser door 40 between a stowed position (e.g., see FIGS. 2-4) and one or more deployed positions (e.g., FIG. 5 depicts the first thrust reverser door 40 in a completely deployed configuration). As will be explained below, when the first thrust reverser door 40 is in a deployed configuration, a first thrust reverser passage 78 is opened up between the fixed structure 38 and the door 40.

The second thrust reverser door 42 extends between a first (e.g., forward) door end 80 and a second (e.g., aft) door end 82. As explained above, the aft structure 34 is configured to form an aft portion of an outer aerodynamic flow surface 46 of the nacelle 22 (see FIG. 1). The second thrust reverser door 42 extends circumferentially (e.g., between 150-180 degrees) about the centerline 24 between opposing door sides 84A, 84B. The second thrust reverser door 42 includes an inner arcuate panel 86 and an outer arcuate panel 88. The outer arcuate panel 88 includes an interior surface 114 and an exterior surface 116. The inner arcuate panel 86 is contiguous with the interior surface 114 of the outer arcuate panel 88 and may be attached to the interior surface 114. As indicated above, the inner arcuate panel 86 is configured to mate with the aft segments 44A, 44B of the fixed structure 38 to define a respective portion of the inner aerodynamic surface 48 and, thus, a respective outer peripheral boundary portion of the gas path 50 when the first thrust reverser door 40 is in its stowed position. Thus, when the second thrust reverser door 42 is in the stowed (e.g., closed) position, the interior surface 118 of the inner arcuate panel 86 is substantially flush with the interior surface 63 of the fixed structure 38. When the second thrust reverser door 42 is in the stowed position, the exterior surface 116 of the outer arcuate panel 88 defines a respective portion of the outer aerodynamic surface 46 (see FIG. 1). In some embodiments when the second thrust reverser door 42 is in the stowed position, the outer arcuate panel 88 is configured to circumferentially and axially overlap a portion of the fixed structure 38.

The second thrust reverser door 42 is pivotally attached to both the first and second support arms 35, 37 via the STRD hinges 41A, 41B. In the embodiment shown in the FIGURES, one of the STRD hinges 41A, 41B is fixedly attached (i.e., non-rotationally attached) to one side of the second thrust reverser door 42 and pivotally attached via a pivot joint 90A, 90B to one of the first or second support arms 35, 37, and the other STRD hinges 41A, 41B is fixedly attached (i.e., non-rotationally attached) to the opposite side of the second thrust reverser door 42 and pivotally attached via a pivot joint 90A, 90B to the other of the first or second support arms 35, 37. In the embodiments shown in the FIGURES, the pivot joints 90A, 90B pivot about a pivot axis 77 (in FIG. 3, pivot axis 77 extends out of the page). A second actuator 92 (e.g., a hydraulic, pneumatic or mechanical linear actuator) is configured between and attached to the fixed structure 38 and the second thrust reverser door 42. With this configuration, the second actuator 92 is operable to move (e.g., pivot) the second thrust reverser door 42 between a stowed position (e.g., see FIGS. 2-4) and one or more deployed positions (e.g., FIG. 5 depicts the second thrust reverser door 42 in a completely deployed configuration). As will be explained below, when the second thrust reverser door 42 is in a deployed configuration, a second thrust reverser passage 94 is opened up between the fixed structure 38 and the door 42.

Figure 3:
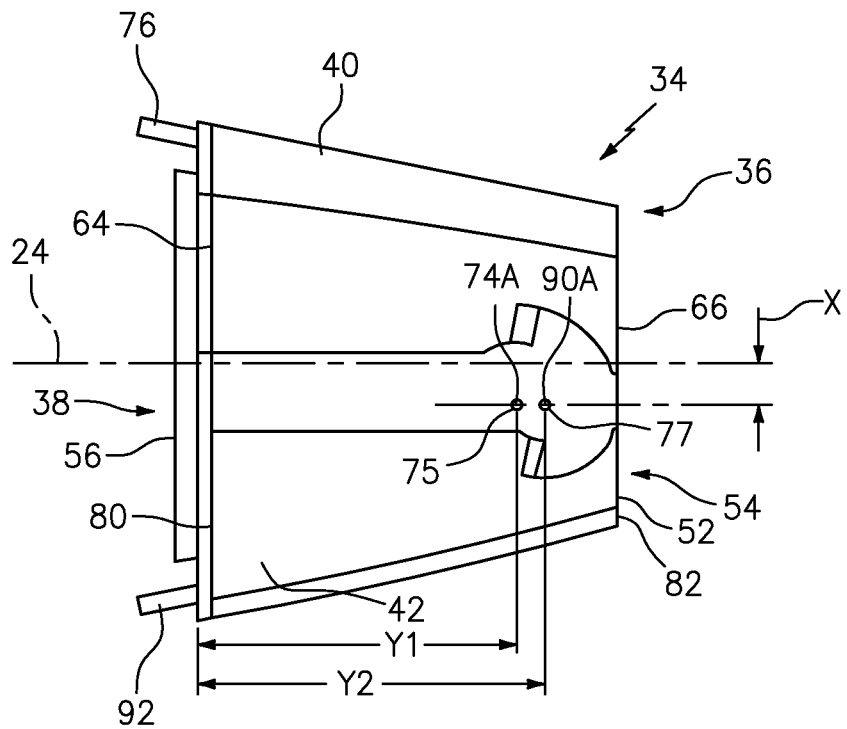
FIG. 3 is a side illustration of an aft structure of the aircraft propulsion system with stowed thrust reverser doors, in accordance with various embodiments.
Figure 4:
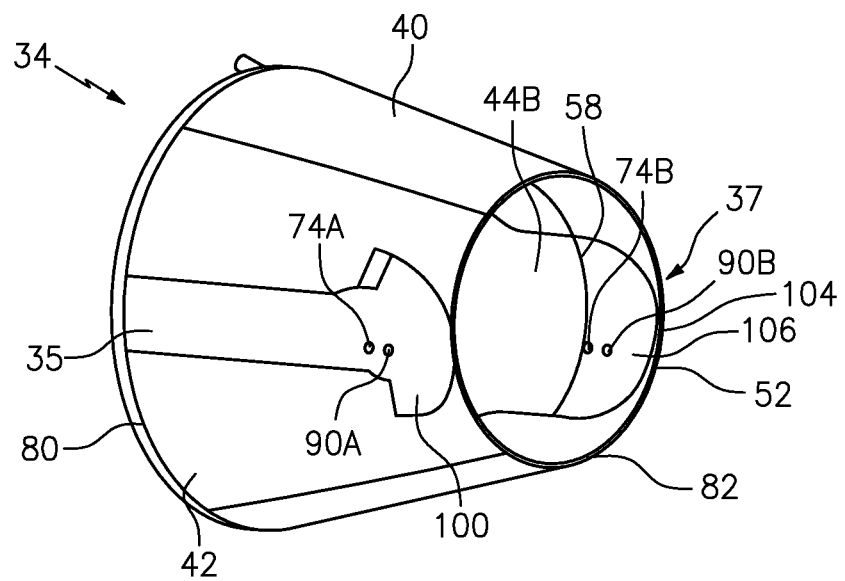
FIG. 4 is a rear perspective illustration of an aft structure of the aircraft propulsion system with stowed thrust reverser doors, in accordance with various embodiments.

Referring to FIG. 3, as described above the pivot joints 74A, 74B for the first thrust reverser door 40 (via hinges 39A, 39B) are disposed on opposite sides of the aft structure 34. The pivot joints 74A, 74B are disposed in the same position on the opposite sides; e.g., axial distance "Y1" from the forward end 56 of the fixed structure 38, and radial distance "X" from the axial centerline 24. The pivot joints 90A, 90B for the second thrust reverser door 42 (via hinges 41A, 41B) are disposed on opposite sides of the aft structure 34. The pivot joints 90A, 90B are disposed in the same position on the opposite sides; e.g., axial distance "Y2" from the forward end 56 of the fixed structure 38, and radial distance "X" from the axial centerline 24. Hence, the first thrust reverser door 40 pivot joints 74A, 74B and the second thrust reverser door 42 pivot joints 90A, 90B are radially displaced the same distance "X" from the axial centerline 24. In the embodiments shown in the FIGURES, the axial distance "Y2" for the second thrust reverser door pivot joints 90A, 90B is greater than the axial distance "Y1" for the first thrust reverser door pivot joints 74A, 74B.

It should be noted that the distance "X" is described from the axial centerline 24 of the nacelle 22. The present disclosure is not limited to locating the pivot joints off of the axial centerline 24. Rather, the reference datums of the nacelle centerline 24 and the forward end 56 of the fixed structure 38 are arbitrarily chosen for explanation sake. In some instances, the nacelle axial centerline 24 may be collinear with the engine centerline, but not necessarily. It should be noted further that the distances "Y1" and "Y2" are described above as referenced from the forward end 56 of the fixed structure 38. The forward end 56 of the fixed structure 38 is an arbitrarily chosen reference point, and the distances "Y1" and "Y2" may be referenced from an alternative reference point, subject to the statement that the axial distance "Y2" for the second thrust reverser door pivot joints 90A, 90B is greater than the axial distance "Y1" for the first thrust reverser door pivot joints 74A, 74B.

The above described pivot joint 74A, 74B, 90A, 90B configuration, and the configuration of the thrust reverser doors 40, 42 provide several benefits. For example, configurations of the present disclosure thrust reverser permit the thrust reverser doors 40, 42 to be positioned in an aft position, and to rotate without interference. Positioning the thrust reverser doors 40, 42 in this manner facilitates the thrust reverser achieving "area match". The term "area match" refers to an aerodynamic match between the gas path area when the thrust reverser doors are disposed in the stowed position and when the thrust reverser doors are fully deployed. To achieve an "area match" (which may be quantified in terms of pressure difference produced at the nacelle exit), it is typically necessary to provide a substantially greater gas path flow area when the doors 40, 42 are in the fully deployed position than the gas path area when the doors 40, 42 are in the stowed position; e.g., the core gas being turned within the deployed thrust reverser is subject to a substantially higher flow resistance than the core gas normally exiting the engine nozzle 54—increasing the flow area through the thrust reverser (e.g., passages 78 and 94) mitigates the difference. Hence, the aerodynamic "area match".

Figure 6:
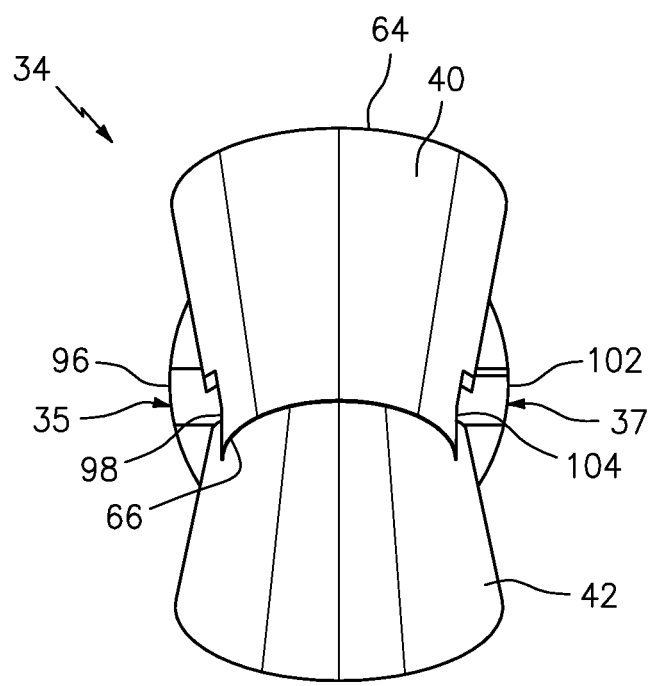
FIG. 6 is a rear view illustration of the aft structure of the aircraft propulsion system with deployed thrust reverser doors, in accordance with various embodiments.
Figure 7:
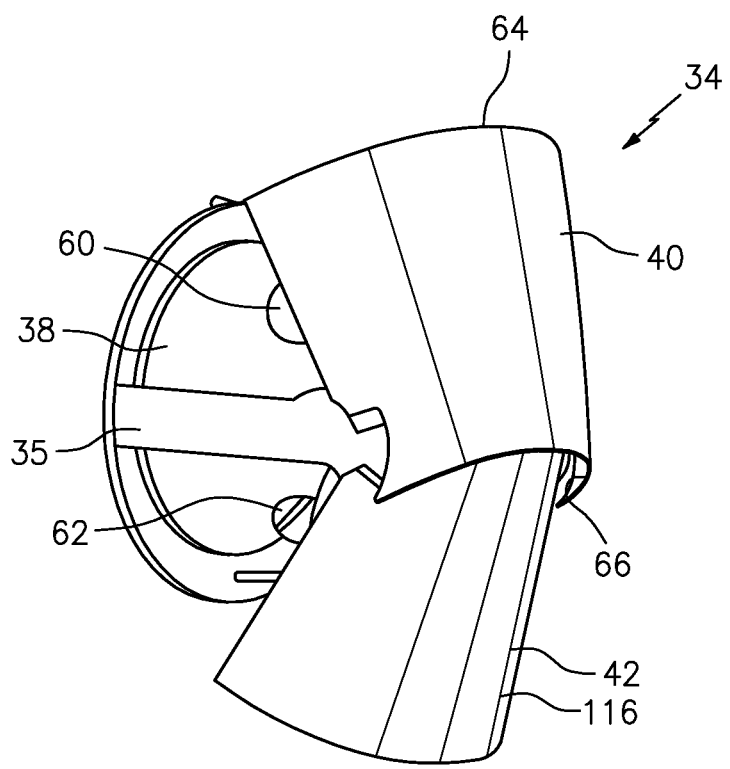
FIG. 7 is a rear perspective illustration of the aft structure of the aircraft propulsion system with deployed thrust reverser doors, in accordance with various embodiments.
Figure 8:
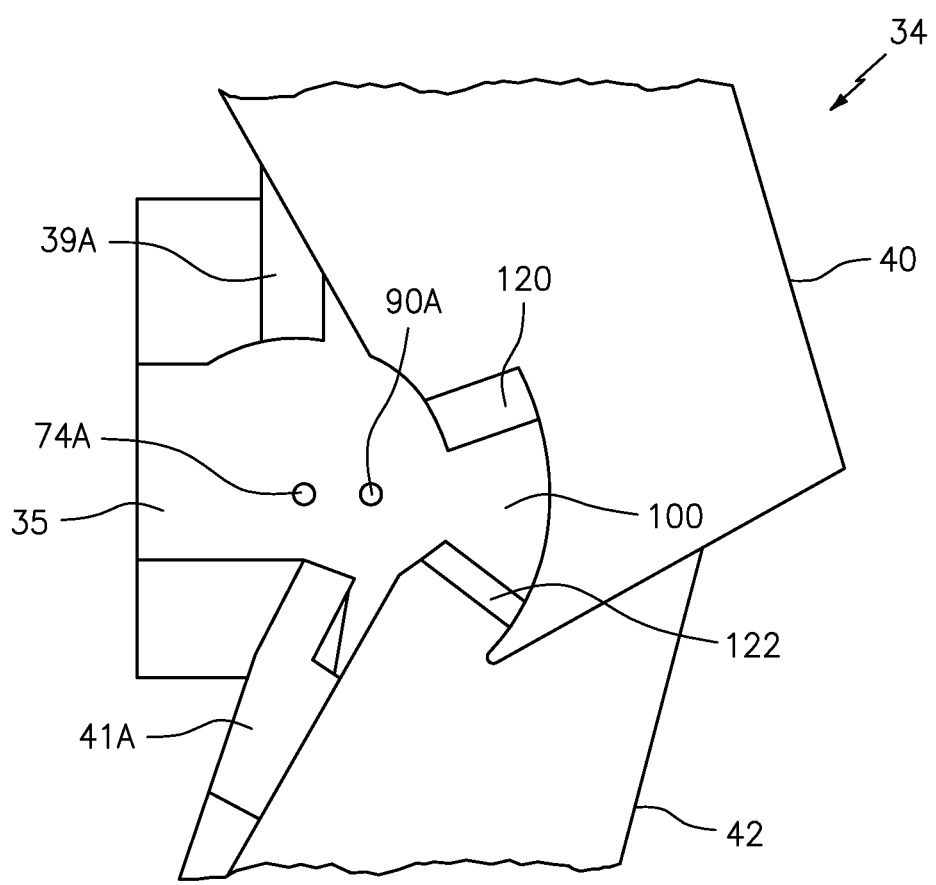
FIG. 8 is an enlarged view of a portion of the aft structure of the aircraft propulsion system with deployed thrust reverser doors shown in FIG. 7, in accordance with various embodiments.

Another significant benefit of embodiments of the present disclosure is that the above described configurations create a "line-of-sight" blockage when the thrust reverser doors are fully deployed. As can be seen in FIGS. 6 and 7, when the thrust reverser doors 40, 42 are fully deployed, the "normal" axial gas path that exists when the doors 40, 42 are stowed is completely obstructed. By obstructing the "normal" axial gas path, core gas that would normally exit the nozzle 54 producing thrust is rerouted through the thrust reverser 36. As a result, that rerouted core gas produces reverse thrust rather than normal forward thrust and therefore increases the efficiency of the thrust reverser.

Another significant benefit is the fact that the thrust reverser doors can be articulated from a stowed position to a fully deployed position without interfering with one another. This aspect of the present disclosure avoids the need for timed or synchronized deployment of the thrust reverser doors 40, 42.

Figure 9A:
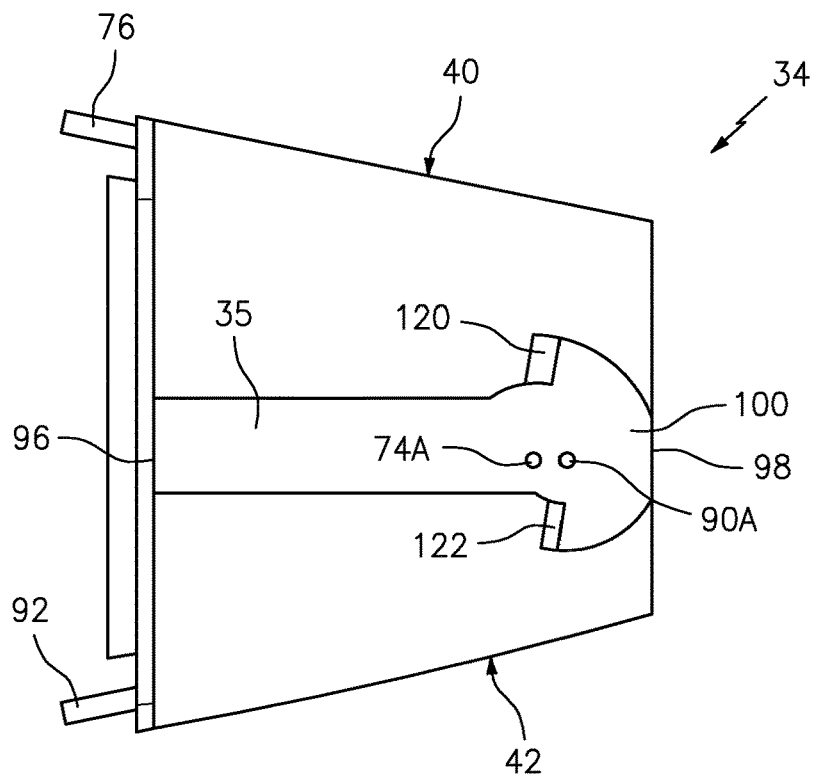
FIGS. 9A-9E illustrate a sequence of the thrust reverser doors moving from a stowed position to a fully deployed position.
Figure 9B:
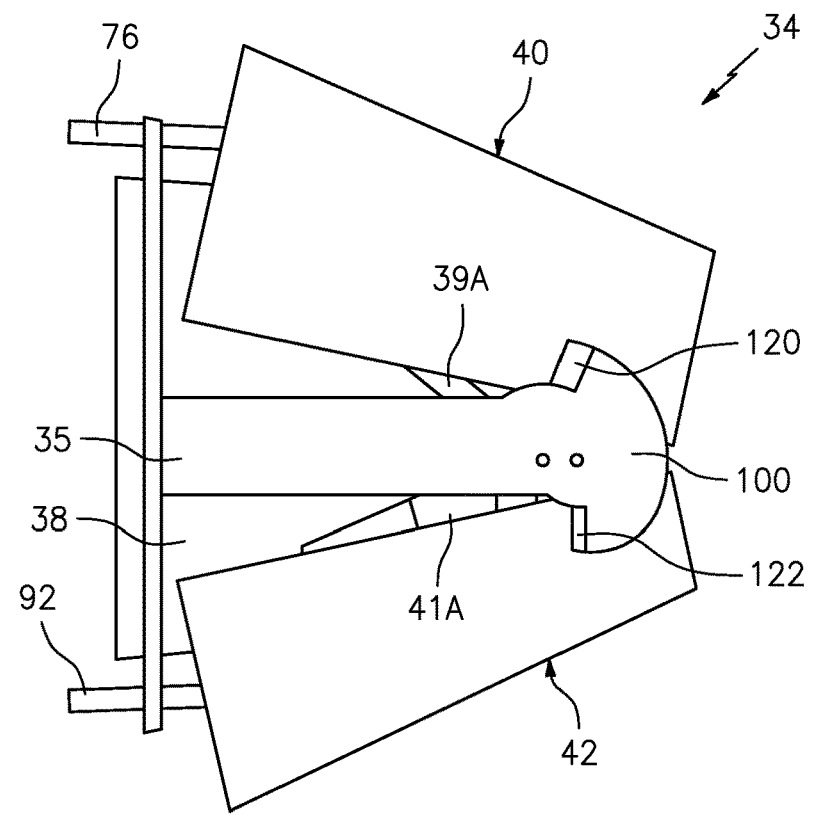
Figure 9C:
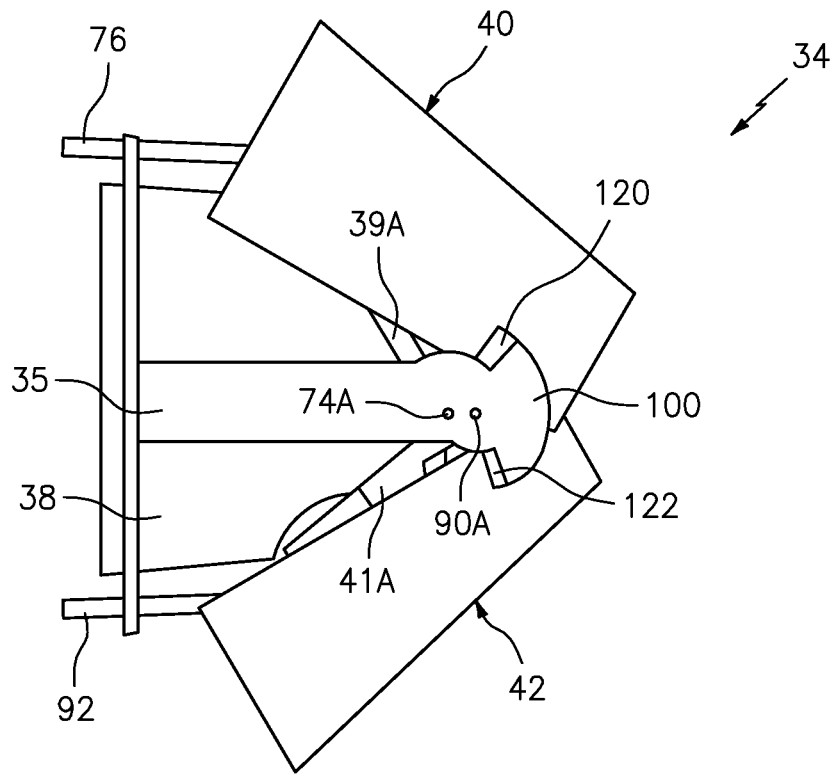
Figure 9D:
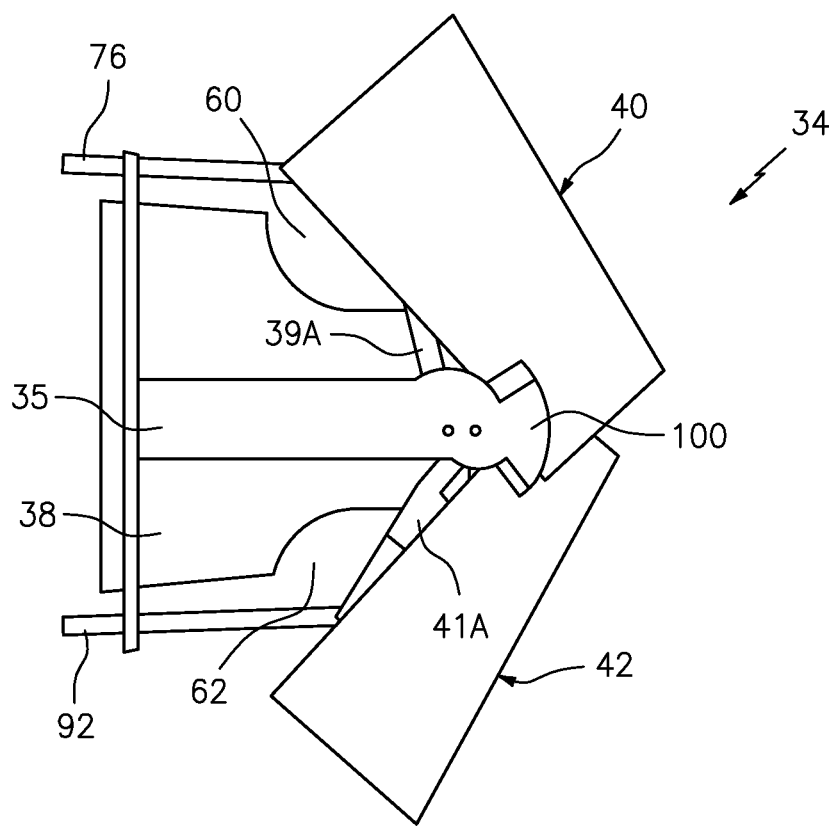
Figure 9E:
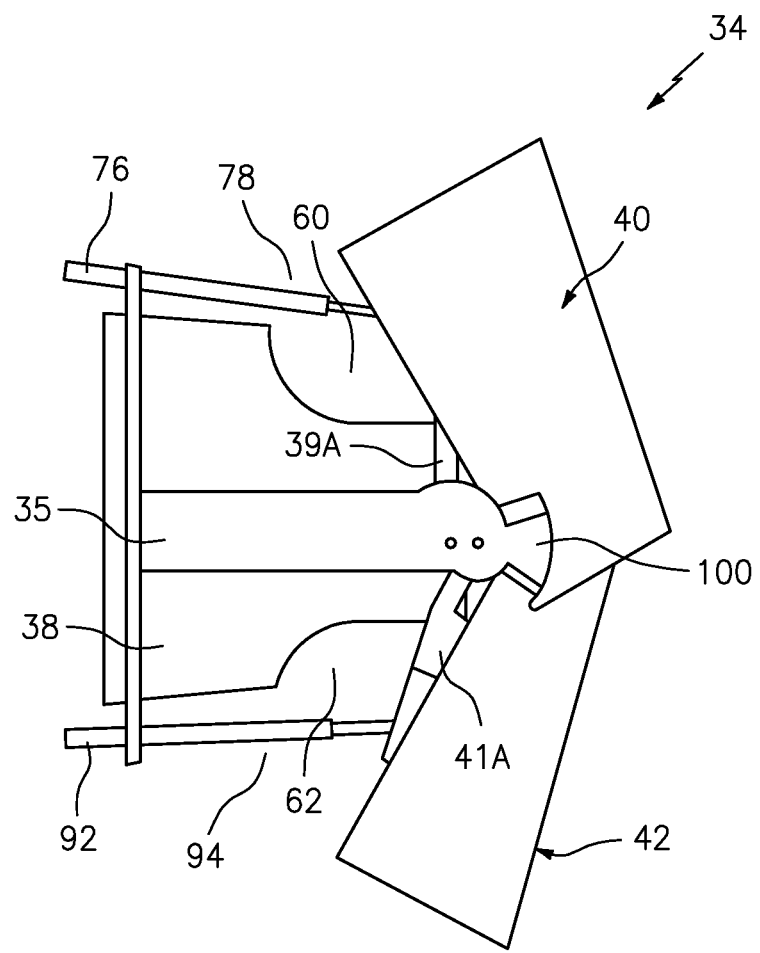

FIGS. 9A-9E illustrate a sequence of the thrust reverser 36 deploying, where the thrust reverser doors 40 and 42 are stowed in FIG. 9A and the thrust reverser doors 40 and 42 are fully deployed in FIG. 9E. During deployment, the first and the second actuators 76 and 92 respectively push against the thrust reverser doors 40 and 42 causing the doors 40 and 42 to pivot about the pivot joints 74A, 74B and 90A, 90B. As the thrust reverser doors 40 and 42 pivot, a forward portion of each door 40, 42 projects radially outward into the surrounding environment and an aft portion of each door 40, 42 projects radially inward into the gas path 50. The aft portions of the doors 40, 42 are thereby operable to at least partially obstruct the gas path 50 proximate the nozzle 54, and redirect the gas flowing axially aft through the gas path 50 radially outward and forward through the thrust reverser passages 78 and 94.

In the embodiment shown in FIGS. 9A-9E, the first thrust reverser door 40 includes a pair of seal segments 120; i.e., one seal segment 120 engages the first support arm flange surface 100 and the other seal segment 120 engages the second support arm flange surface 106. Similarly, the second thrust reverser door 42 includes a pair of seal segments 122; i.e., one seal segment 122 engages the first support arm flange surface 100 and the other seal segment 122 engages the second support arm flange surface 106.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

As an example, the present disclosure thrust reverser 36 is shown in the FIGURES as having a first thrust reverser door 40 disposed vertically, radially above a second thrust reverser door 42. The present disclosure is not limited to thrust reverser doors 40, 42 vertically, radially aligned. In alternative embodiments, the present disclosure thrust reverser doors may actuate laterally. As another example, the FIGURES show the first thrust reverser door 40 and the second thrust reverser door 42 with particular pivot axes. The described pivot axes cause a portion of the first thrust reverser door 40 to be disposed axially aft of a portion of the second thrust reverser door 42. In alternative embodiments, the described configurations of the doors 40, 42 and their respective pivot axes could be reversed.

What is claimed is:

1. An assembly for an aircraft propulsion system, comprising:
   a fixed structure at least partially defining a gas path, the fixed structure having a first side, an opposite second side, and an axial centerline;
   a first thrust reverser door and a second thrust reverser door;
   a first support arm disposed on the first side of the fixed structure and a second support arm disposed on the second side of the fixed structure;
   wherein the first thrust reverser door being pivotally attached to the first support arm and the second support arm at first pivot joints, the first thrust reverser door having a first axis of rotation radially located at a first distance from the axial centerline in a first radial direction and at a first axial position, and the second thrust reverser door being pivotally attached to the first support arm and the second support arm at second pivot joints, the second thrust reverser door having a second axis of rotation radially located at the first distance from the axial centerline in the first radial direction and at a second axial position, the second axial position being displaced from the first axial position;
   the first thrust reverser door and the second thrust reverser door being rotatable between a stowed position and a plurality of deployed positions.

2. The assembly of claim 1, further comprising a pair of first thrust reverser door hinges, one of which first thrust reverser door hinges is fixedly attached to the first thrust reverser door and pivotally attached to the first support arm, and the other first thrust reverser door hinge is fixedly attached to the first thrust reverser door and pivotally attached to the second support arm.

3. The assembly of claim 2, further comprising a first actuator configured to rotate the first thrust reverser door about the first axis of rotation.

4. The assembly of claim 3, wherein the first thrust reverser door is attached to the first actuator and the pair of first thrust reverser door hinges.

5. The assembly of claim 2, further comprising a pair of second thrust reverser door hinges, one of which second thrust reverser door hinges is fixedly attached to the second thrust reverser door and pivotally attached to the first support arm, and the other second thrust reverser door hinge is fixedly attached to the second thrust reverser door and pivotally attached to the second support arm.

6. The assembly of claim 5, further comprising a second actuator configured to rotate the second thrust reverser door about the second axis of rotation.

7. The assembly of claim 6, wherein the second thrust reverser door is attached to the second actuator and the pair of second thrust reverser door hinges.

8. The assembly of claim 1, wherein in at least one of the plurality of deployed positions, the first thrust reverser door and the second thrust reverser door collectively block the gas path at a nozzle end of the assembly.

9. The assembly of claim 1 wherein in the stowed position, the first thrust reverser door forms a portion of the gas path.

10. The assembly of claim 9, wherein the first thrust reverser door includes an inner panel that mates with the fixed structure to form the portion of the gas path.

11. The assembly of claim 1 wherein in the stowed position, the second thrust reverser door forms a portion of the gas path.

12. The assembly of claim 11, wherein the second thrust reverser door includes an inner panel that mates with the fixed structure to form the portion of the gas path.

13. A thrust reverser assembly for an aircraft propulsion system, the thrust reverser assembly having an axial centerline, the assembly comprising:
    a fixed structure;
    a first thrust reverser door and a second thrust reverser door;
    wherein the first thrust reverser door is pivotally attached to the fixed structure along a first pivot axis, and the second thrust reverser door is pivotally attached to the fixed structure along a second pivot axis;
    wherein the first pivot axis and the second pivot axis are both radially located at a first distance from the axial centerline of the thrust reverser assembly in a first radial direction; and
    wherein the first pivot axis is located at a first axial position, and the second pivot axis is located at a second axial position, the second axial position displaced from the first axial position;
    wherein the first thrust reverser door and the second thrust reverser door are rotatable between a stowed position and a plurality of deployed positions.

14. The thrust reverser assembly of claim 13, further comprising a first support arm disposed on and attached to the first side of the fixed structure and a second support arm disposed on and attached to the second side of the fixed structure;
    wherein the first thrust reverser door is pivotally attached to the first support arm and to the second support arm; and
    wherein the second thrust reverser door is pivotally attached to the first support arm and to the second support arm.

15. The thrust reverser assembly of claim 14, further comprising a pair of first thrust reverser door hinges, one of the pair of first thrust reverser door hinges is fixedly attached to the first thrust reverser door and pivotally attached to the first support arm, and the other first thrust reverser door hinge is fixedly attached to the first thrust reverser door and pivotally attached to the second support arm.

16. The thrust reverser assembly of claim 15, further comprising a first actuator configured to rotate the first thrust reverser door about the first pivot axis.

17. The thrust reverser assembly of claim 14, further comprising a pair of second thrust reverser door hinges, one of the pair of second thrust reverser door hinges is fixedly attached to the second thrust reverser door and pivotally attached to the first support arm, and the other second thrust reverser door hinge is fixedly attached to the second thrust reverser door and pivotally attached to the second support arm.

18. The thrust reverser assembly of claim 17, further comprising a second actuator configured to rotate the second thrust reverser door about the second pivot axis.

19. The thrust reverser assembly of claim 13, wherein the fixed structure at least partially defines a gas path, and in at least one of the plurality of deployed positions, the first thrust reverser door and the second thrust reverser door collectively block the gas path at a nozzle end of the thrust reverser assembly.

20. The thrust reverser assembly of claim 19, wherein in the stowed position, the first thrust reverser door and the second thrust reverser door each forms a portion of the gas path.

* * * * *